(12) United States Patent
Kang et al.

(10) Patent No.: US 12,065,365 B2
(45) Date of Patent: Aug. 20, 2024

(54) FILTER CASE, AND WATER PURIFIER AND WATER SOFTENER USING FILTER CASE

(71) Applicant: SIONTECH CO., LTD., Daejeon (KR)

(72) Inventors: Kyung Seok Kang, Daejeon (KR); Nam Soo Park, Daejeon (KR); Kyung Han Lee, Daejeon (KR)

(73) Assignees: SIONTECH CO., LTD., Daejeon (KR); KYUNGDONG NAVIEN CO., LTD., Pyeongtaek-si (KR)

( * ) Notice: Subject to any disclaimer, the term of this patent is extended or adjusted under 35 U.S.C. 154(b) by 770 days.

(21) Appl. No.: 17/286,156

(22) PCT Filed: Oct. 11, 2019

(86) PCT No.: PCT/KR2019/013375
§ 371 (c)(1),
(2) Date: Apr. 16, 2021

(87) PCT Pub. No.: WO2020/080756
PCT Pub. Date: Apr. 23, 2020

(65) Prior Publication Data
US 2021/0387873 A1    Dec. 16, 2021

(30) Foreign Application Priority Data
Oct. 19, 2018  (KR) .................. 10-2018-0125511

(51) Int. Cl.
*C02F 1/469* (2023.01)
*C02F 1/00* (2023.01)
(Continued)

(52) U.S. Cl.
CPC ............ *C02F 1/4691* (2013.01); *C02F 1/008* (2013.01); *C02F 1/4602* (2013.01); *C02F 5/00* (2013.01);
(Continued)

(58) Field of Classification Search
None
See application file for complete search history.

(56) References Cited

U.S. PATENT DOCUMENTS

2004/0251213 A1* 12/2004 Bradley .................. C02F 1/463
                                                        205/676
2012/0199486 A1*  8/2012 Kang .................... C02F 1/4691
                                                        427/126.3
2019/0308893 A1* 10/2019 Choi ..................... C02F 1/4691

FOREIGN PATENT DOCUMENTS

KR    10-2004-0079036 A    9/2004
KR    10-2005-0041059 A    5/2005
(Continued)

OTHER PUBLICATIONS

Machine translation to English of application KR 10-2015-0065300 (Year: 2015).*

*Primary Examiner* — J. Christopher Ball
(74) *Attorney, Agent, or Firm* — NKL LAW; Jae Youn Kim

(57) ABSTRACT

Disclosed is a filter and a filter case using CDI, and a water purifier and a water softener using the filter case. Specifically, the filter case comprises: a case having a cylindrical shape and including a receiving space formed therein; a first cover having an inlet formed in the center thereof and configured to close one side of the case; and a second cover having an outlet formed in the center thereof and configured to close the other side of the case.

5 Claims, 10 Drawing Sheets

(51) Int. Cl.
*C02F 1/46* (2023.01)
*C02F 5/00* (2023.01)
(52) U.S. Cl.
CPC .. *C02F 2201/005* (2013.01); *C02F 2201/006* (2013.01); *C02F 2209/02* (2013.01); *C02F 2209/03* (2013.01); *C02F 2209/40* (2013.01)

(56) References Cited

FOREIGN PATENT DOCUMENTS

| | | |
|---|---|---|
| KR | 10-1015621 B1 | 2/2011 |
| KR | 10-1237258 B1 | 2/2013 |
| KR | 10-2013-0027678 A | 3/2013 |
| KR | 10-2014-0111091 A | 9/2014 |
| KR | 10-2015-0043603 A | 4/2015 |
| KR | 10-2015-0050742 A | 5/2015 |
| KR | 10-1741529 B1 | 6/2017 |
| KR | 10-1990293 B1 | 9/2019 |

\* cited by examiner

FILTER CASE, AND WATER PURIFIER AND WATER SOFTENER USING FILTER CASE

TECHNICAL FIELD

The present invention is an invention related to a filter using capacitive deionization (CDI) and a filter case, and is an invention related to a water purification and softening device using the filter case.

BACKGROUND ART

Patent Invention 001 is an invention related to a method of manufacturing a CDI module, and more particularly relates to a method of manufacturing an ion-selective capacitive deionization electrode, which includes: (a) a step of manufacturing a first composition including an electrode active material and one or more resins selected from among an ion exchange resin, a cross-linkable ion exchange resin, and a nonionic resin; (b) a step of manufacturing an active layer by applying the first composition to a current collector or performing a calendering process on the first composition; and (c) a step of coating the surface of the active layer with an ion-selective polymer matrix solution, which includes a cross-linkable ion exchange resin, a cross-linking agent, a monomer, and a polymerization initiator, and cross-linking the same.

Patent Invention 002 relates to a system for controlling the amount of purified water for an electrodeionization-type water purifier, in which an electrodeionization-type filter can operate in a mode for purifying raw water or can operate in a mode for removing pollutants adsorbed to the electrodeionization-type filter. The system for controlling the amount of purified water for an electrodeionization-type water purifier according to a preferred embodiment of Patent Invention 002 includes: a first-type filter module operating in one mode among a filtering mode for filtering raw water using the electrodeionization-type filter and a regeneration mode for removing pollutants adsorbed to the electrodeionization-type filter; a second-type filter module operating in a mode different from the mode of the first-type filter module; a flow rate control valve for changing the ratio of the amount of purified water, which is the flow rate of purified water discharged from the filter module operating in the filtering mode, among the filter modules, to the regeneration amount, which is the flow rate of regenerated water discharged from the filter module operating in the regeneration mode, among the filter modules; and a controller for controlling the ratio of the amount of purified water to the regeneration amount by controlling the flow rate control valve in consideration of the concentration of the raw water.

A CDI-type filter module according to Patent Invention 003 includes a filter unit, purifying raw water through a CDI method using an electrode having an electrode tab, and a terminal unit, electrically connected to the electrode tab to supply power to the electrode from an external power source. Here, the terminal unit includes a conductive terminal plate, having one end in contact with the electrode tab, and a conductive terminal pin, extending from the terminal plate toward the electrode tab to penetrate the electrode tab.

A CDI-type filter according to Patent Invention 004 relates to a CDI-type filter that purifies raw water through a CDI method using an electrode unit, which is formed such that electrodes and separators are alternately stacked, wherein the electrode unit is formed to be long in the longitudinal direction rather than the width direction, and has therein through-holes, which are arranged with a predetermined interval therebetween in the longitudinal direction, are elongated in the width direction, and penetrate the electrode unit in the thickness direction.

RELATED ART DOCUMENTS

Patent Documents (Patent Document 001) KR 10-1237258 B1 (registered on Feb. 20, 2013)
(Patent Document 002) KR 10-2014-0111091 A (published on Sep. 18, 2014)
(Patent Document 003) KR 10-2015-0043603 A (published on Apr. 23, 2015)
(Patent Document 004) KR 10-2015-0050742 A (published on May 11, 2015)

DISCLOSURE

Technical Problem

The present invention is an invention related to a filter using CDI and a filter case, and is an invention related to a water purification and softening device using the filter case.

Technical Solution

The present invention is an invention related to a filter case, and specifically includes: a case 100 having a cylindrical shape and having an accommodation space 110 formed therein; a first cover 210 having an inlet 211 formed in the center thereof and closing one side of the case; and a second cover 220 having an outlet 221 formed in the center thereof and closing the opposite side of the case.

The filter case of the present invention described above includes: a division unit 120, which includes a partition plate 121 located in the case to divide the accommodation space into two portions; a first accommodation portion 110a, which is formed between the first cover and the partition plate in the accommodation space; and a second accommodation portion 110b, which is formed between the second cover and the partition plate in the accommodation space.

The filter case of the present invention described above includes one or more division plates 400 disposed in the first accommodation space and the second accommodation space.

The filter case of the present invention described above includes: a power supply terminal 510 formed at the second cover; a power supply plate 520 contacting the power supply terminal and disposed on the inner side of the case in the longitudinal direction; and a power contact plate 530 formed on one surface and the circumferential surface of each of the division plates and contacting the power supply plate.

The present invention is an invention related to a water purification and softening device, and specifically includes: a housing 20, which is formed as a sealed enclosure and accommodates the filter case of any one of claims 1 to 4; a discharge pipe 610, which communicates with the outlet of the filter case 10 and extends to the outside of the housing; and a supply pipe 620, which communicates with the inlet of the filter case and is configured to receive water supplied thereto.

The water purification and softening device of the present invention described above includes a temperature-setting unit 700, which is provided in the middle of the discharge pipe and is configured to adjust the temperature of the discharged water.

The water purification and softening device of the present invention described above includes a pressure compensation device 800, which is provided in the middle of the supply pipe and is configured to adjust the pressure of the supplied water.

Advantageous Effects

The present invention is characterized in that a bipolar CDI is configured such that multiple toroidal-shaped CDI plates are in contact with each other and in that raw water is supplied thereto in the circumferential direction and purified water is discharged through a hole formed in the center thereof.

The present invention is an invention related to a water purifier using a plurality of bipolar CDI units, and has an advantage in which the CDI units form sections, whereby a deionization process is performed in multiple stages.

A filter case of the present invention has structural characteristics such that the replacement and assembly thereof are facilitated and such that it is sufficiently capable of supporting a load caused by water pressure therein.

The filter case of the present invention has structural characteristics for preventing the occurrence of disconnection of a power terminal due to water pressure therein.

In the filter case of the present invention, since multiple division plates are assembled so as to separate multiple bipolar CDI units from each other, it is possible to easily change and set the capacity of the filter case.

BEST MODE

Figure 1:
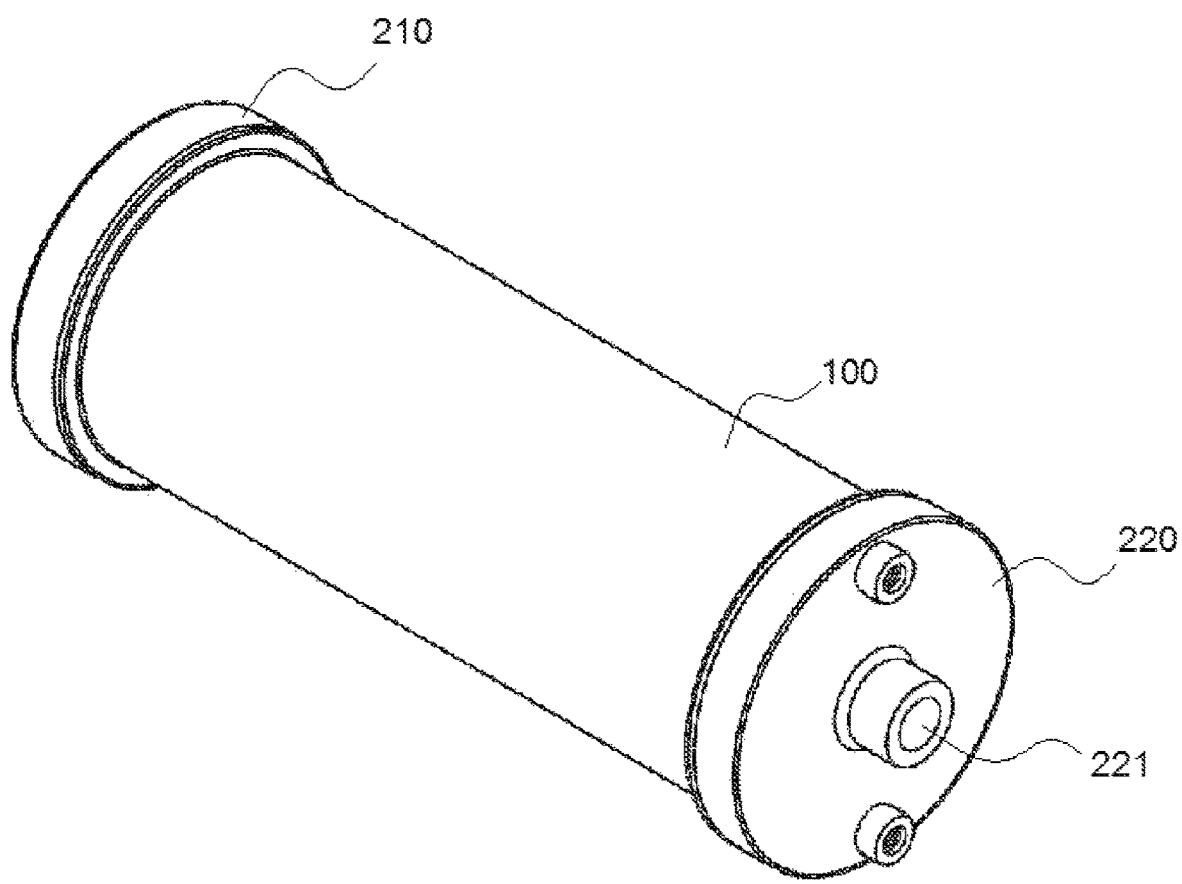
FIG. 1 is a perspective view showing the external appearance of a filter case of the present invention.
Figure 2:
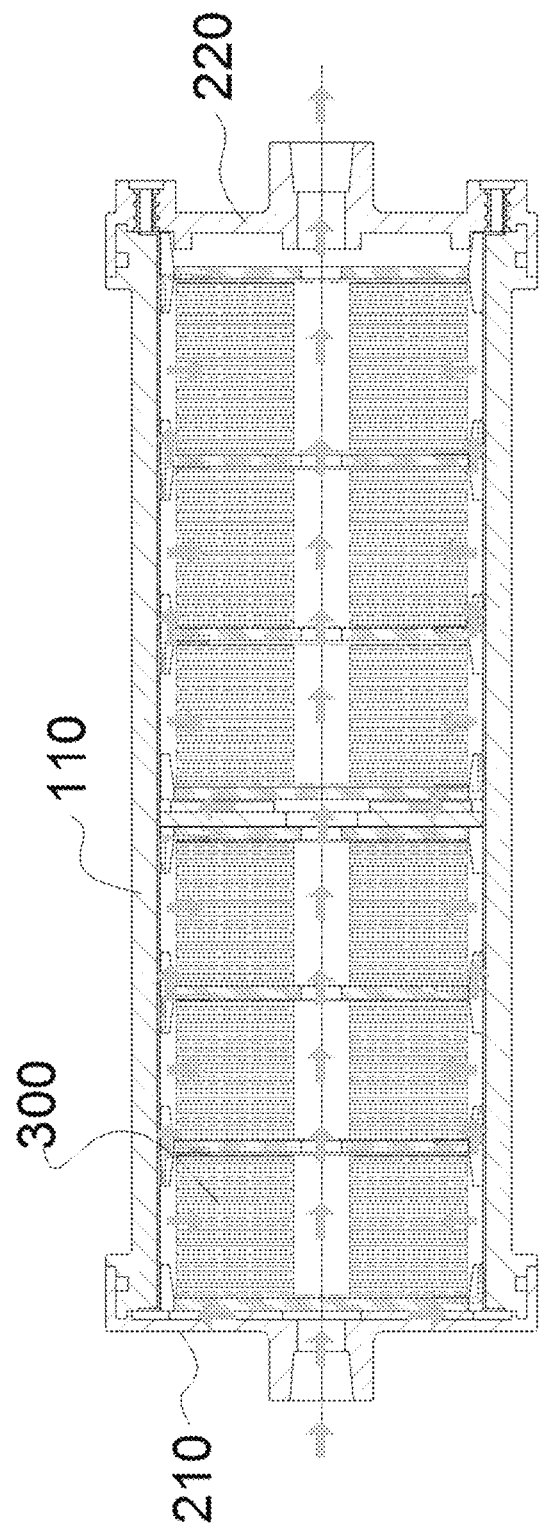
FIG. 2 is a view showing a filter and the filter case of the present invention and the flow of raw water.
Figure 3:
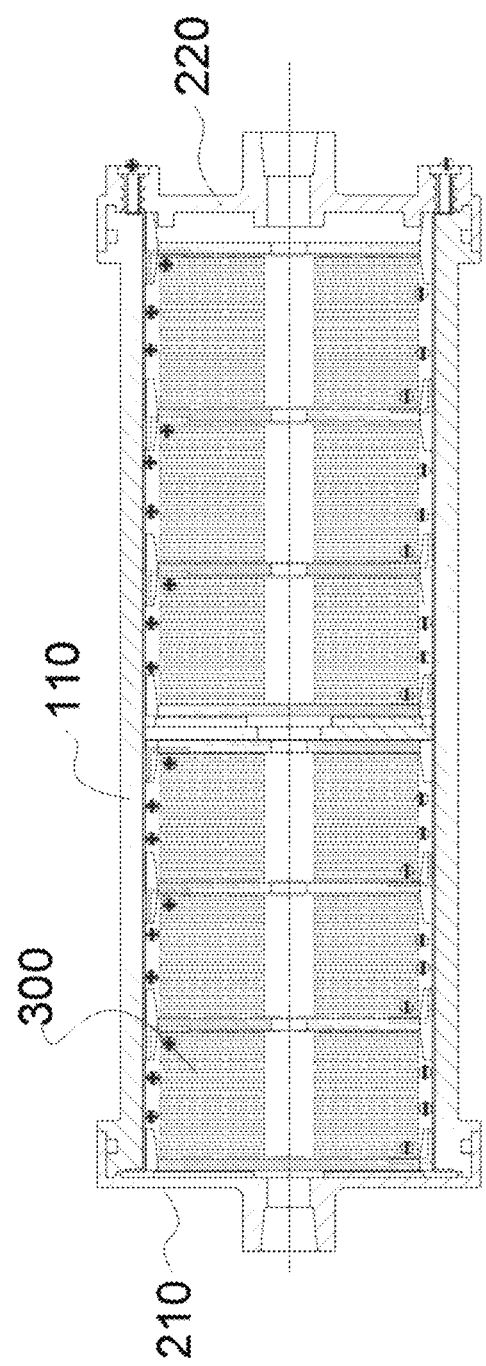
FIG. 3 is a view showing the supply of power to a CDI unit of the present invention.
Figure 4:
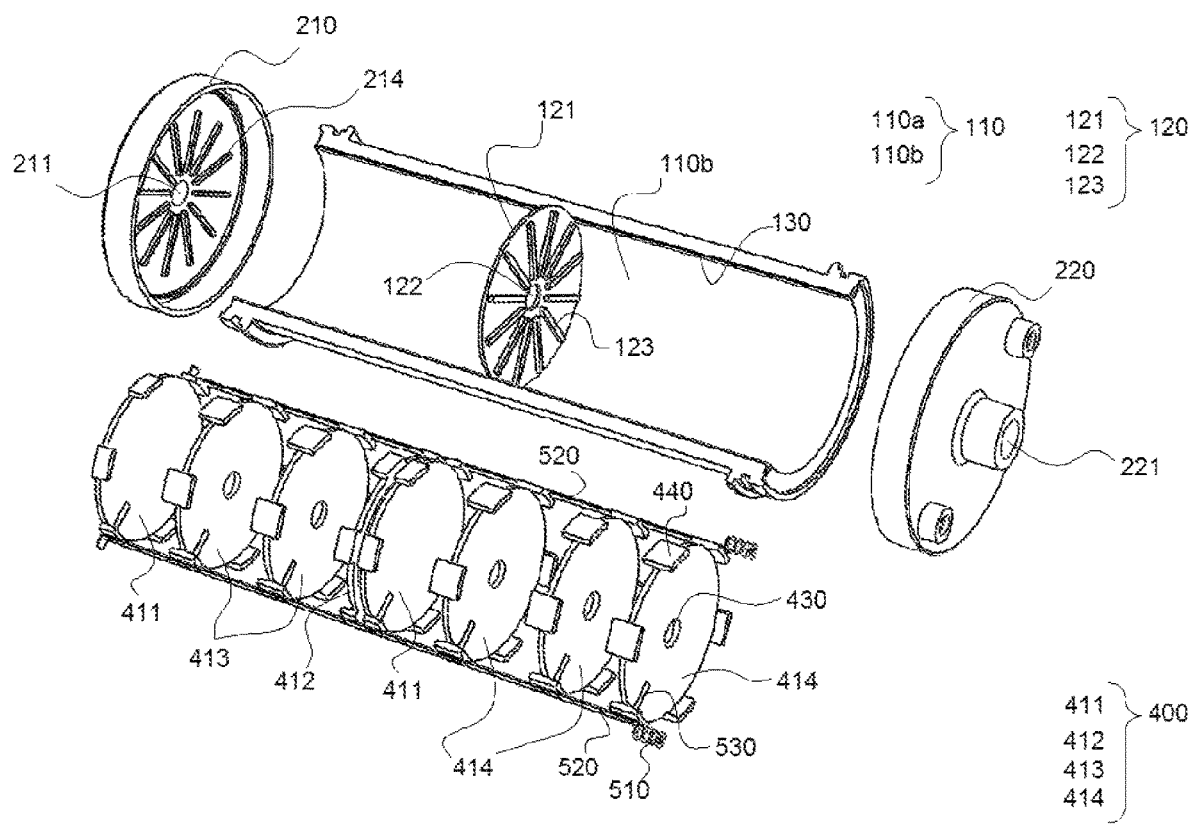
FIGS. 4 and 5 are exploded perspective views showing the interior of the filter case of the present invention.
Figure 5:
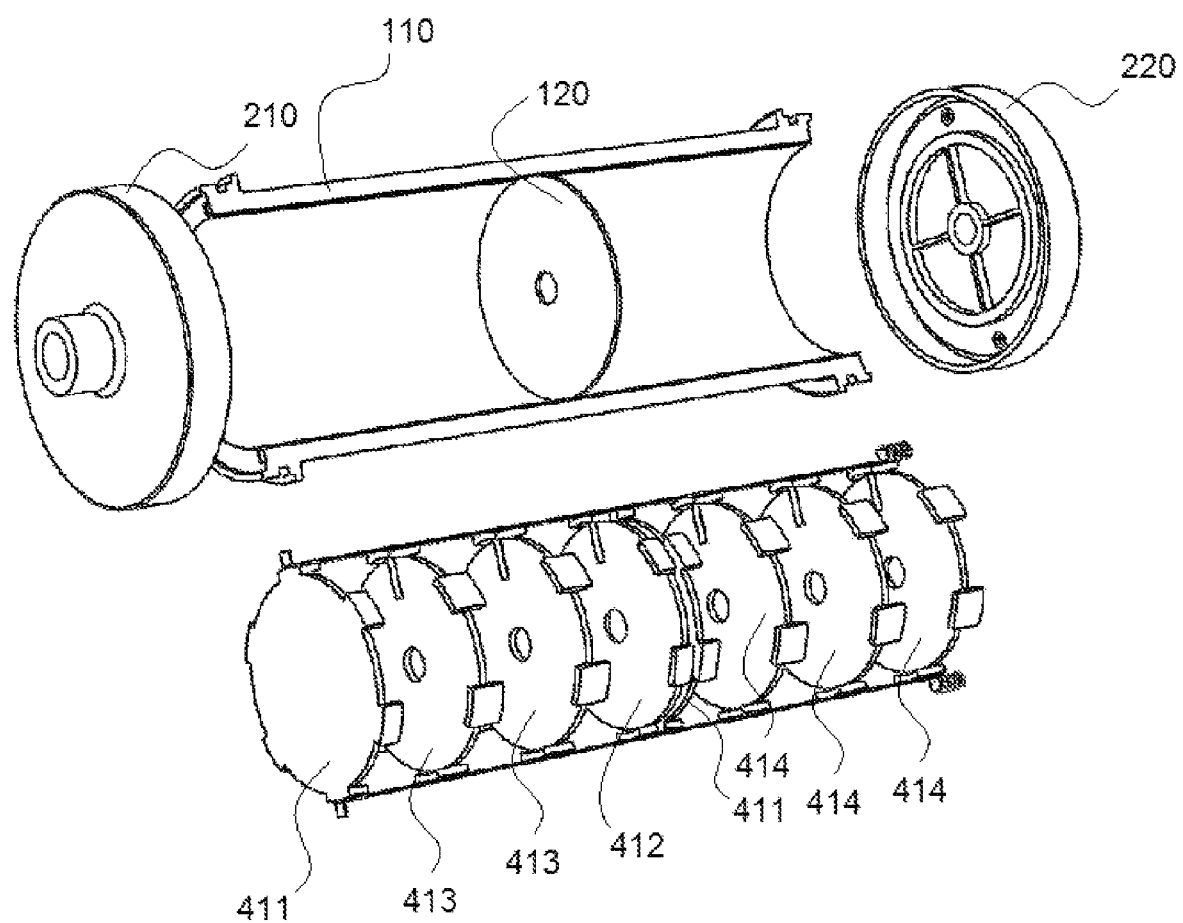
Figures 6A, 6B:
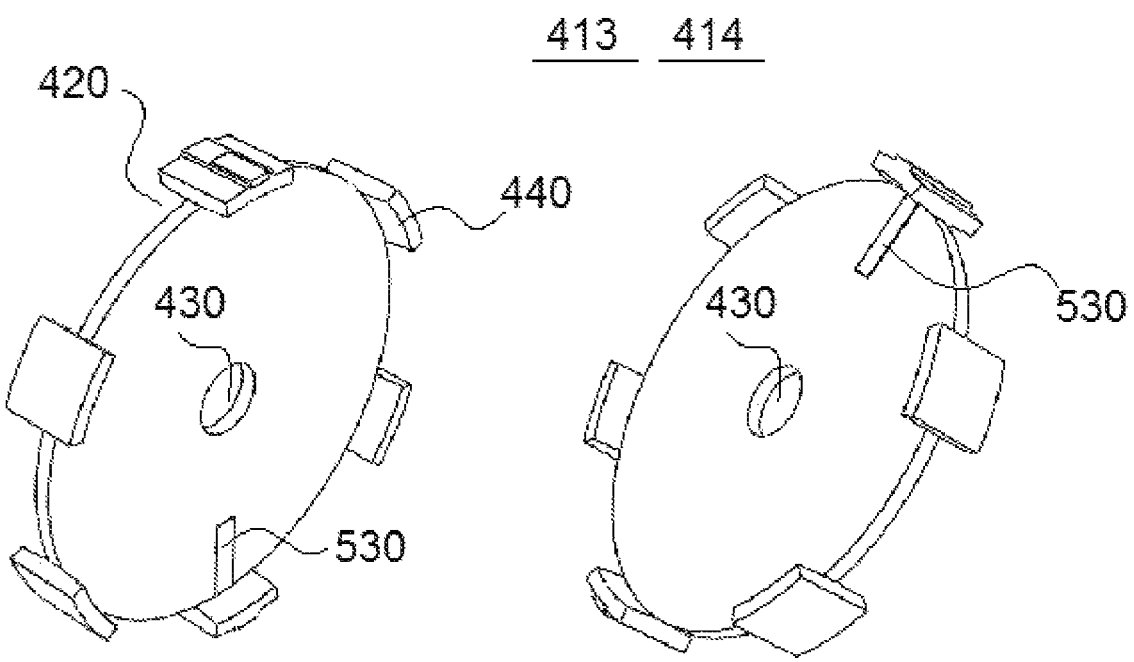
FIGS. 6A-6B to 8A-8B are perspective views of a division plate of the present invention.
Figure 7A:
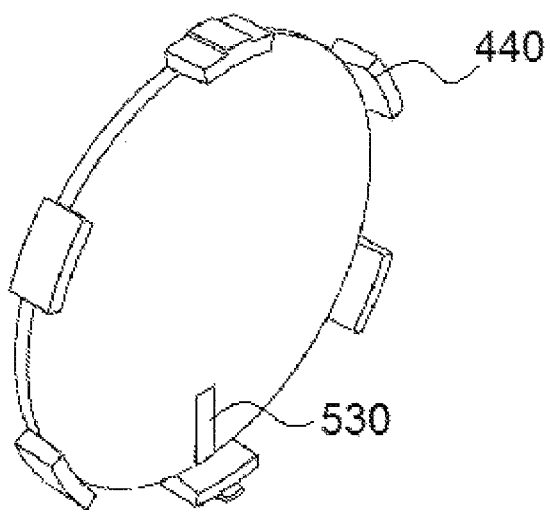
Figure 7B:
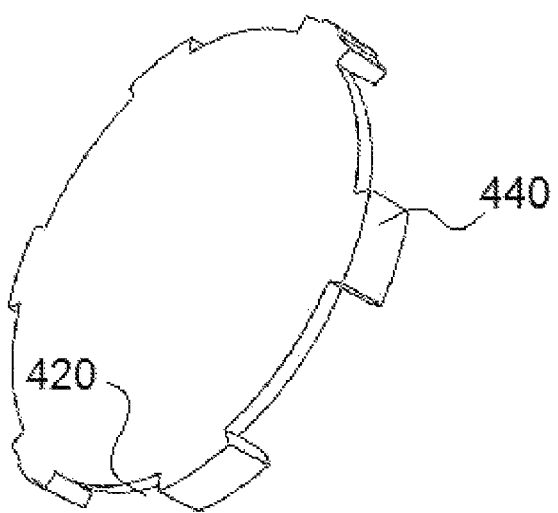
Figures 8A, 8B:
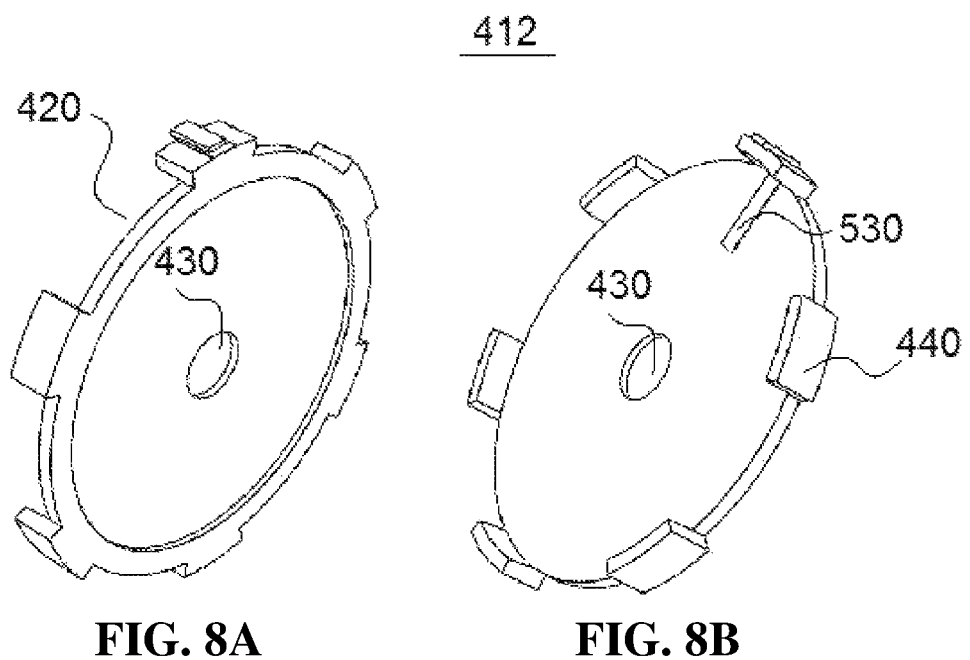
Figure 9:
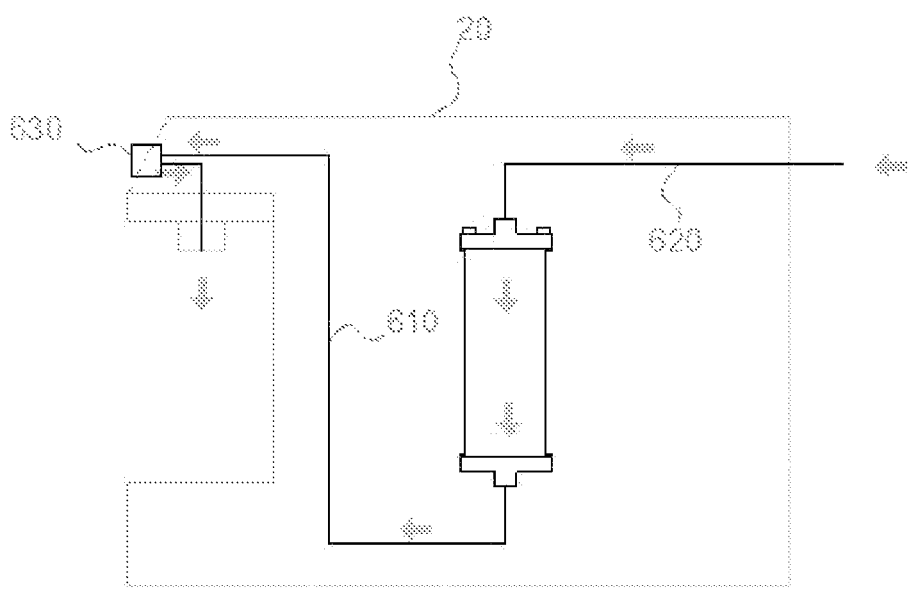
FIGS. 9 and 10 are conceptual diagrams showing the operation of a water purification and softening device of the present invention.
Figure 10:
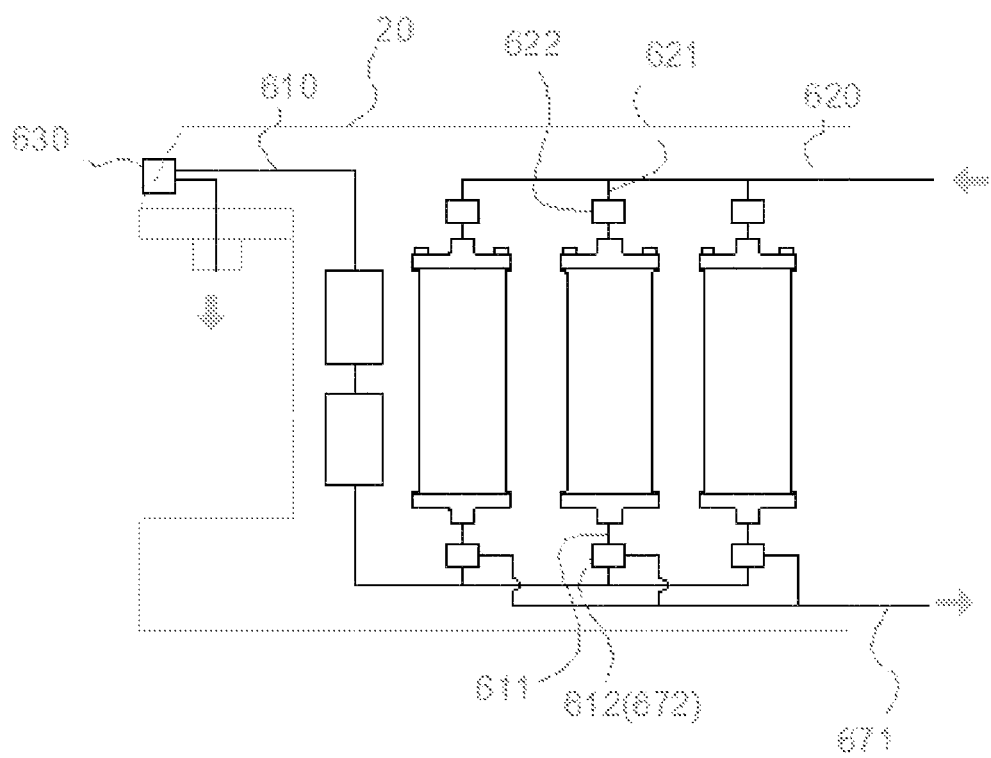

Hereinafter, the most preferred embodiment of the present invention will be described in detail so that the invention may be easily carried out by those skilled in the art to which the invention pertains. The numbers of embodiments set forth herein, which have correspondence relationships therebetween, are merely given in order to help understand the technology. The correspondence relationships between the embodiments may be variously changed. Even if not mentioned in the embodiments below, components can be replaced by any other means having similar purposes or exhibiting similar effects. Superordinate terms used in the embodiments include subordinate terms not mentioned herein.

[Embodiment 1-1] The present invention relates to a filter case, and specifically includes: a case 100 having a cylindrical shape and having an accommodation space 110 formed therein; a first cover 210 having an inlet 211 formed in the center thereof and closing one side of the case; and a second cover 220 having an outlet 221 formed in the center thereof and closing the opposite side of the case.

The present invention is an invention related to a filter case accommodating a filter used in a water purification and softening device. The two opposite ends of the case are sealed with the first cover and the second cover, and a filter is accommodated in the sealed space in the case. Raw water is supplied through the first cover, and water purified by the filter is discharged through the second cover.

[Embodiment 1-2] This corresponds to the filter case according to Embodiment 1-1 of the present invention, but includes a first fastening member 212 for engaging the case and the first cover.

[Embodiment 1-3] This corresponds to the filter case according to Embodiment 1-1 of the present invention, but includes a second fastening member 222 for engaging the case and the second cover.

The case and the first cover are engaged by the first fastening member, and the case and the second cover are engaged by the second fastening member. The first fastening member and the second fastening member form a structure in which male threads formed at the first cover and/or the second cover are engaged with female threads formed at the two opposite sides of the case or in which the fastening protrusions formed on the first cover and/or the second cover are inserted into fastening recesses formed in the two opposite sides of the case. Alternatively, any other equivalent means for engaging the case and the cover may be included.

[Embodiment 1-4] This corresponds to the filter case according to Embodiment 1-1 of the present invention, but includes a first sealing member 213 coupled between the case and the first cover.

[Embodiment 1-5] This corresponds to the filter case according to Embodiment 1-1 of the present invention, but includes a second sealing member 223 coupled between the case and the second cover.

The case and the first cover (the second cover) are completely engaged with each other in order to prevent water from leaking to the outside. To this end, the first cover and the case are provided with the first sealing member, and the second cover and the case are provided with the second sealing member. O-rings are preferably used as the first and second sealing members. Alternatively, gaskets may be used as means equivalent thereto. Each sealing member may be configured as one or more O-rings.

[Embodiment 1-6] This corresponds to the filter case according to Embodiment 1-1 of the present invention, but includes a CDI electrode 300 accommodated in the accommodation space.

A toroidal plate-shaped CDI electrode plate is used as the filter. The capacitive deionization (CDI) electrode plate is manufactured in a bipolar form. Multiple bipolar CDI plates are stacked to form a single unit. Raw water is supplied from the circumference of the circular plate, and ion-exchanged water is discharged through the center of the toroidal plate.

[Embodiment 1-7] This corresponds to the filter case according to Embodiment 1-1 of the present invention, but includes a first flow guide 214 formed on the inner surface of the first cover so as to protrude.

Raw water enters the accommodation space through the inlet formed in the center of the first cover. The raw water entering the accommodation space needs to pass through the CDI electrode. In order to supply the raw water toward the circumferential surface of the CDI electrode, it is required to move the raw water entering the accommodation space in the circumferential direction. To this end, the first flow guide is formed on the inner surface of the first cover in order to induce the flow of raw water in the circumferential direction. The first flow guide is composed of a plurality of protruding plates, and the raw water flows through the space between the plates. The space extends in the radial direction. In another embodiment, grooves may be formed in the inner surface of the first cover in the radial direction so as to form flow passages of the raw water.

[Embodiment 2-1] This corresponds to the filter case according to Embodiment 1-1 of the present invention, but includes: a division unit 120, which includes a partition plate 121 located in the case to divide the accommodation space into two portions; a first accommodation portion 110*a*, which is formed between the first cover and the partition plate in the accommodation space; and a second accommodation portion 110*b*, which is formed between the second cover and the partition plate in the accommodation space.

The division unit of the present invention divides the interior of the case. Each CDI unit is accommodated in a respective one of the inner spaces resulting from division of the case in order to perform the water purification process in successive steps.

The division unit is formed in a partition plate shape, and has a through-hole 122 formed in the center thereof. The through-hole is a passage for supplying the water purified in the first accommodation portion to the second accommodation portion therethrough. In another embodiment, an inner stepped portion may be fixedly formed in the case, and the partition plate may be seated on the inner stepped portion.

[Embodiment 2-2] This corresponds to the filter case according to Embodiment 2-1 of the present invention, except that the thickness of the partition plate is greater than the thickness of the case.

A predetermined magnitude of water pressure is maintained in the case. The case may be deformed by the water pressure. Such deformation of the case causes disconnection of contact terminals. In order to prevent this, it is preferable that the partition plate be located at the center of the case in the longitudinal direction. In order to sufficiently withstand the water pressure, the partition plate is formed to have a predetermined thickness, which is preferably greater than the thickness of the case. In another embodiment, in the case in which an inner stepped portion is formed in the case, the thickness of the inner stepped portion may be greater than the thickness of the case. In still another embodiment, an outer stepped portion may be formed on the outer periphery of the case. The thickness of the outer stepped portion may be greater than the thickness of the case.

[Embodiment 2-3] This corresponds to the filter case according to Embodiment 2-1 of the present invention, but includes a second flow guide 123 formed on one surface of the partition plate so as to protrude.

Ion exchange needs to be primarily performed on the raw water in the first accommodation portion, and needs to be secondarily performed in the second accommodation portion.

The raw water supplied to the first accommodation portion is supplied to the second accommodation portion through the through-hole in the partition plate. The reason for this is to supply the water to the CDI unit accommodated in the second accommodation portion. The water that has passed through the through-hole needs to be dispersed in the circumferential direction. In order to realize dispersion in the circumferential direction, a plurality of protrusions is formed on one surface of the partition plate so as to protrude in the radial direction. Second flow passages are formed between the protrusions. In another embodiment, a plurality of grooves is formed in one surface of the partition plate in the radial direction. The grooves define the second flow passages. The second flow passages mentioned above may be formed in a straight line shape, or may be formed in a curved line shape. The cross-sectional shape of the flow passage may be formed so as to be uniform, or may be formed so as to gradually change.

[Embodiment 3-1] This corresponds to the filter case according to Embodiment 2-1 of the present invention, but includes one or more division plates 400 disposed in the first accommodation space and the second accommodation space.

An object of the present invention is to further divide the interior of each of the first accommodation space and the second accommodation space. In order to further divide the first accommodation space (the second accommodation space), one or more division plates are inserted into the first accommodation space and/or the second accommodation space. A CDI unit is inserted into the space defined by the division plates. That is, a plurality of CDI units is inserted into each of the accommodation spaces (first and second accommodation spaces), and the CDI units are separated from each other by the division plates. The reason for this is to realize a multi-stage ion-exchange process.

[Embodiment 3-2] This corresponds to the filter case according to Embodiment 3-1 of the present invention, except that the division plates include: a first division plate 411 located adjacent to each of one side of the first cover and one side of the partition plate; a second division plate 412 contacting the opposite side of the partition plate; a third division plate 413 interposed between the first division plate and the second division plate; and a fourth division plate 414 interposed between the first division plate and the second cover.

[Embodiment 3-3] This corresponds to the filter case according to Embodiment 3-2 of the present invention, except that the third division plate and the fourth division plate are formed to have the same shape.

[Embodiment 3-4] This corresponds to the filter case according to Embodiment 3-2 of the present invention, except that the first to fourth division plates are formed to have the same shape.

[Embodiment 3-5] This corresponds to the filter case according to Embodiment 3-2 of the present invention, but includes: division-plate flow grooves 420 formed in the circumferential surface of each of the first to fourth division plates so as to be arranged at regular intervals; and a division-plate discharge hole 430 formed through the center of each of the second to fourth division plates.

[Embodiment 3-6] This corresponds to the filter case according to Embodiment 3-1 of the present invention, but includes a seating protrusion 440 formed on one surface or on both opposite surfaces of each of the division plates in order to define the position of the CDI unit.

The division plates of the present invention include four types of division plates (first to fourth division plates). Depending on the types of the division plates, the mounting positions thereof in the case are different from each other. This is due to the difference in the direction of inflow and outflow of water to be deionized and the positions of contact with the first and second covers and with the partition plate. However, the division plates have the same configuration in terms of the division-plate flow grooves and the seating protrusions. The division-plate flow grooves are formed in the outer circumferential surfaces of the division plates so that water is supplied in the circumferential direction, and the seating protrusions stably support the CDI units.

[Embodiment 4-1] This corresponds to the filter case according to Embodiment 3-1 of the present invention, but includes: a power supply terminal 510 formed at the second cover; a power supply plate 520 contacting the power supply terminal and disposed on the inner side of the case in the longitudinal direction; and a power contact plate 530 formed on one surface and the circumferential surface of each of the division plates and contacting the power supply plate.

An object of the present invention is to supply current to the CDI unit in the case. The power supply terminal is formed at the first cover and/or the second cover. In order to supply the current from the power supply terminal to the CDI unit, the power supply plate is formed inside the case in the longitudinal direction. The cross-sectional shape of the power supply plate is formed uniformly. The power supply plate is electrically connected to the power supply terminal. Each of the division plates, which is in contact with the CDI unit, is provided with the power contact plate, and the power contact plate is in contact with the power supply plate. Therefore, the current outside the case is transmitted to the power supply plate via the power supply terminal, the current from the power supply plate is transmitted to the power contact plate, and the power contact plate supplies power to the CDI unit.

[Embodiment 4-2] This corresponds to the filter case according to Embodiment 4-1 of the present invention, except that the power supply terminal is two in number, and anode current and cathode current are respectively transmitted to the two power supply terminals.

The CDI unit is formed by stacking a plurality of bipolar CDIs, and direct current of different polarities is alternately transmitted to the bipolar CDIs. In order to supply the direct current, two power supply terminals are provided, and anode (+) current and cathode (−) current are respectively supplied to the two terminals.

[Embodiment 4-3] This corresponds to the filter case according to Embodiment 4-1 of the present invention, but includes a power-supply-plate insertion groove 130 concavely formed in the inner circumferential surface of the case in the longitudinal direction so as to allow the power supply plate to be inserted thereinto.

The power supply plate is disposed along the inner wall of the case in the longitudinal direction. The power-supply-plate insertion groove is formed in the inner wall of the case in order to fix the position of the power supply plate and to prevent interference with the same. The power supply plate is inserted into and fixed in the power-supply-plate insertion groove.

[Embodiment 4-4] This corresponds to the filter case according to Embodiment 4-1 of the present invention, except that the power supply plate has a curved surface formed in the cross-sectional direction.

[Embodiment 4-5] This corresponds to the filter case according to Embodiment 4-1 of the present invention, except that the power contact plate is formed in an L-shape, one side of which is located on one surface of the division plate and the other side of which is located on the outer circumferential surface of the division plate.

[Embodiment 4-6] This corresponds to the filter case according to Embodiment 4-2 of the present invention, but includes a contact protrusion 533 formed on the other side of the power contact plate such that a portion thereof protrudes.

In order to allow the power supply plate to be stably fitted into the power-supply-plate insertion groove, the power supply plate is formed to have a curved cross-section. The two opposite end surfaces of the power supply plate are elastically fitted into the power-supply-plate insertion groove, whereby it is possible to secure stable coupling. In order to secure stable contact between the power contact plate of the division plate and the power supply plate, the power supply plate is formed to have a predetermined degree of elasticity. Accordingly, the curved surface of the power supply plate is in elastic contact with the power contact plate, whereby it is possible to exhibit a stable conduction effect.

[Embodiment 5-1] The present invention relates to a water purification and softening device, and specifically includes: a housing 20, which is formed as a sealed enclosure and accommodates the filter case of any one of claims 1 to 4; a discharge pipe 610, which communicates with the outlet of the filter case 10 and extends to the outside of the housing; and a supply pipe 620, which communicates with the inlet of the filter case and is configured to receive water supplied thereto.

In the water purification and softening device according to the present invention, the filter case proposed in Embodiment 1-4 is accommodated in the housing. Raw water is supplied to the filter case in the housing through the supply pipe. The purified water deionized in the filter case is discharged to the outside of the housing through the discharge pipe.

[Embodiment 5-2] This corresponds to the water purification and softening device according to Embodiment 5-1 of the present invention, but includes a flow control valve 630, which is provided at the discharge pipe and has a switch protruding to the outside of the housing.

In order to control the flow rate or the ON/OFF operation of the filter, a user operates the flow control valve provided at the discharge pipe. It is possible to control the flow control valve by directly operating the switch protruding outside the housing. Alternatively, the flow control valve may be controlled using an electric signal generated by operation of the switch provided outside the housing. In another embodiment, a supply pump may be provided at the supply pipe, and the amount of rotation of the supply pump may be controlled according to the degree of opening/closing of the switch.

In addition, it is possible to control the amount of current supplied to the filter case according to the degree of opening/closing of the switch.

[Embodiment 5-3] This corresponds to the water purification and softening device according to Embodiment 5-2 of the present invention, except that the filter case is provided in a plural number. The water purification and softening device includes: a supply branch pipe 621, which has one side coupled to the inlet of each of the filter cases and an opposite side coupled to the supply pipe; and a discharge branch pipe 611, which has one side coupled to the outlet of each of the filter cases and an opposite side coupled to the discharge pipe.

[Embodiment 5-4] This corresponds to the water purification and softening device according to Embodiment 5-3 of the present invention, but includes: opening/closing valves 612 and 622 respectively located in the supply branch pipe and the discharge branch pipe; and a flow controller 640 configured to operate the opening/closing valves in response to a signal received from the flow control switch.

In the present invention, multiple filter cases are accommodated in a single housing, and the multiple filter cases are connected in parallel. The number of filter cases to be operated is changed depending on the amount of water used by the user. That is, in the case of using a large amount of purified water, the multiple filter cases are operated simultaneously to purify water, and in the case of using a small amount of purified water, only one filter case is operated to purify water. This operation is realized by the flow controller mounted in the housing. The flow controller receives a signal from the switch operated by the user and operates each opening/closing valve and each filter case accordingly.

[Embodiment 5-5] This corresponds to the water purification and softening device according to Embodiment 5-1 of the present invention, but includes a filter case-fixing member 650, which is fixed in the housing and is configured to allow the filter case to be detachably mounted thereto.

The filter case mounted in the housing of the present invention has a limited lifespan. When the lifespan of the filter case expires, the filter case needs to be replaced. In order to facilitate installation and removal of the filter case at the time of replacement thereof, the fixing member is provided. An elastic plate or a binding band may be used as the fixing member, or any other means equivalent thereto may be used.

[Embodiment 5-6] This corresponds to the water purification and softening device according to Embodiment 5-1 of the present invention, but includes: a drain pipe 671 branched from the middle of the discharge pipe; a drain valve 672 provided in the drain pipe; and a drain controller 673 configured to control the operation of the drain valve.

The filter case of the present invention receives direct current and purifies raw water through an ion-exchange process.

During the water purification process, the direct current needs to be temporarily switched. The water discharged during the switching process needs to be drained to the outside. To this end, the drain pipe is connected to the discharge pipe, and when the current is switched, the drain pipe is opened to drain the water to the outside. This is realized by the drain controller.

[Embodiment 6-1] This corresponds to the water purification and softening device according to Embodiment 5-1 of the present invention, but includes a temperature-setting unit 700, which is provided in the middle of the discharge pipe and is configured to adjust the temperature of the discharged water.

The water purification and softening device of the present invention enables the user to control the temperature of the discharged purified water as needed. To this end, the temperature-setting unit is provided in the discharge pipe. The temperature-setting unit is configured to control the temperature of the discharged water so as to satisfy the temperature set by the user.

Specifically, a cooling/heating device is provided in the discharge pipe. The cooling/heating device increases or decreases the temperature of the discharge pipe to a set value. Therefore, it is possible to adjust the temperature of the discharged water so as to satisfy the user's desired temperature.

[Embodiment 7-1] This corresponds to the water purification and softening device according to Embodiment 5-1 of the present invention, but includes a pressure compensation device 800, which is provided in the middle of the supply pipe and is configured to adjust the pressure of the supplied water.

The water purification and softening device of the present invention receives raw water. The flow rate of water supplied to the interior of the filter case may change according to the pressure at which the raw water is supplied. Therefore, it is required to maintain constant pressure of the raw water supplied to the interior of the filter case. To this end, a pressure compensation chamber 801 is mounted in order to maintain constant pressure of the supplied raw water. Specifically, a spring 802 is mounted in the pressure compensation chamber, and the spring supports a plunger 803. When the pressure becomes equal to or greater than a predetermined pressure, the plunger receives a load and is moved thereby, and the spring elastically supports the plunger. Further, when the pressure decreases below the predetermined pressure, the plunger is moved upwards by the elastic force of the spring, so the pressure in the pressure compensation chamber becomes the predetermined pressure. The other side of the spring is moved in the longitudinal direction by a rotation knob 804, whereby the elastic force of the spring is adjusted. Therefore, it is possible to adjust the set pressure of the pressure compensation chamber using the rotation knob.

DESCRIPTION OF REFERENCE NUMERALS

10: case 20: housing
30: CDI unit 100: case
110: accommodation space 110a: first accommodation portion
110b: second accommodation portion 120: division unit
121: partition plate 122: through-hole
123: second flow guide 130: power-supply-plate insertion groove
210: first cover 211: inlet
212: first fastening member 213: first sealing member
214: first flow guide 220: second cover
221: outlet 222: second fastening member
223: second sealing member 300: CDI electrode
400: division plate 411: first division plate
412: second division plate 413: third division plate
414: fourth division plate 420: division-plate flow groove
430: division-plate discharge hole 440: seating protrusion
510: power supply terminal 520: power supply plate
530: power contact plate 533: contact protrusion
610: discharge pipe 611: discharge branch pipe
612,622: opening/closing valve 620: supply pipe
621: supply branch pipe 630: flow control valve
640: flow controller 650: filter case-fixing member
671: drain pipe 672: drain valve
673: drain controller 700: temperature-setting unit
800: pressure compensation device 801: pressure compensation chamber
802: spring 803: plunger
804: rotation knob

The invention claimed is:
1. A filter case comprising:
a case having a cylindrical shape, the case having an accommodation space formed therein;
a first cover having an inlet formed in a center thereof, the first cover closing one side of the case;
a second cover having an outlet formed in a center thereof, the second cover closing an opposite side of the case;
a capacitive deionization (CDI) electrode accommodated in the accommodation space;
a first flow guide formed on an inner surface of the first cover so as to protrude;
a division unit comprising a partition plate located in the case, the division unit dividing the accommodation space into two portions;
a first accommodation portion formed between the first cover and the partition plate in the accommodation space;

a second accommodation portion formed between the second cover and the partition plate in the accommodation space;

a second flow guide formed on one surface of the partition plate so as to protrude;

one or more division plates disposed in the first accommodation portion and the second accommodation portion;

division-plate flow grooves formed in circumferential surfaces of the division plates so as to be arranged at regular intervals;

division-plate discharge holes formed through centers of the division plates; and a seating protrusion formed on one surface or on both opposite surfaces of each of the division plates to define a position of a CDI unit.

2. The filter case according to claim 1, comprising:

a power supply terminal formed at the second cover;

a power supply plate contacting the power supply terminal, the power supply plate being disposed on an inner side of the case in a longitudinal direction; and a power contact plate formed on one surface and on a circumferential surface of each of the division plates, the power contact plate contacting the power supply plate.

3. A water purification and softening device comprising:

a housing formed as a sealed enclosure, the housing accommodating the filter case of claim 1;

a discharge pipe communicating with the outlet of the filter case, the discharge pipe extending to an outside of the housing;

a supply pipe communicating with the inlet of the filter case, the supply pipe being configured to receive water supplied thereto, wherein the filter case is provided in a plurality thereof;

a supply branch pipe having one side coupled to an inlet of each of the plurality of filter cases and an opposite side coupled to the supply pipe;

a discharge branch pipe having one side coupled to an outlet of each of the plurality of filter cases and an opposite side coupled to the discharge pipe;

opening/closing valves respectively located in the supply branch pipe and the discharge branch pipe; and a flow controller configured to operate the opening/closing valves in response to a signal received from a flow control switch.

4. The water purification and softening device according to claim 3, comprising:

a temperature-setting unit provided in a middle of the discharge pipe, the temperature-setting unit being configured to adjust a temperature of discharged water.

5. The water purification and softening device according to claim 3, comprising:

a pressure compensation device provided in a middle of the supply pipe, the pressure compensation device being configured to adjust a pressure of supplied water.

* * * * *